(12) United States Patent
Meiyappan et al.

(10) Patent No.: US 6,578,098 B1
(45) Date of Patent: Jun. 10, 2003

(54) PREDICTIVE MECHANISM FOR ASB SLAVE RESPONSES

(75) Inventors: Subramanian Meiyappan, Tempe, AZ (US); James J. Jirgal, Chandler, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/435,133

(22) Filed: Nov. 4, 1999

(51) Int. Cl.⁷ .............................................. G06F 13/00
(52) U.S. Cl. ...................... 710/110; 710/104; 710/105; 710/106
(58) Field of Search ................................ 710/100, 104, 710/105, 106, 110

(56) References Cited

U.S. PATENT DOCUMENTS

| | | | |
|---|---|---|---|
| 5,490,265 A | * | 2/1996 | Riches et al. ................ 711/140 |
| 5,550,820 A | * | 8/1996 | Baran ....................... 370/395.5 |
| 5,596,708 A | * | 1/1997 | Weber ........................ 714/42 |
| 5,710,891 A | * | 1/1998 | Normoyle et al. .......... 710/119 |
| 5,794,073 A | | 8/1998 | Ramakrishnan et al. .... 395/860 |
| 5,925,118 A | * | 7/1999 | Revilla et al. .............. 709/208 |

FOREIGN PATENT DOCUMENTS

EP       0718772 A1   6/1996    ........... G06F/13/30

* cited by examiner

Primary Examiner—Rupal Dharia
(74) Attorney, Agent, or Firm—Peter Zawilski

(57) ABSTRACT

The present invention is drawn to a computer implemented method and system for synchronously driving slave responses onto an ASB (advanced system bus) bus. On the one hand, in response to a read transfer from a ASB master, an ASB slave predicts the read transfer to be intended for a device attached to the ASB slave if the device is ready to return read data. On the other hand, in response to a write transfer from the ASB master, the ASB slave predicts the write transfer to be intended for the device attached to the ASB slave. In both scenarios, a device select signal (Dsel) is utilized to validate these two predictions. That is, the read slave response driven by the ASB slave does not enter the ASB bus when the device select signal does not select the ASB slave. Also, the write slave response driven by the ASB slave does not enter the ASB bus when the device select signal does not select the ASB slave. In so doing, when these two predictions are valid, the ASB slave can synchronously drive appropriate slave responses onto the ASB bus without inserting wait states. Moreover, when these two predictions are not valid, wrong slave responses are prevented from entering the ASB bus.

10 Claims, 7 Drawing Sheets

PREDICTIVE MECHANISM FOR ASB SLAVE RESPONSES

FIELD OF THE INVENTION

The present invention is related to a computer bus system. More specifically, the present invention is related to ASB (advanced system bus) slave responses.

BACKGROUND

ASB Bus:

As a microprocessor implementing RISC (reduced instruction set computer) architecture, an ARM (advanced RISC machine) microprocessor is not designed to work within a multiple masters computer system. Yet, by having multiple masters and multiple slaves within a computer system, the computer system gains more versatility in the types of functionalities that can be performed. Thus, in order for an ARM microprocessor to reap various benefits (e.g., functional versatility) associated with having a multiple masters/multiple slaves computer system, the ASB bus was introduced. Typically within the ASB system, multiple masters and slaves are coupled to the ASB bus. The ASB bus allows and supports an ARM microprocessor to function as the part of a multiple masters/multiple slave environment. In particular, the ASB bus is a widely used microprocessor system bus for computer systems based on the ARM family of microprocessors. Furthermore, the nomenclature and concepts relating to the ASB system are explained in detail in "Advanced Microcontroller Bus Architecture Specification" published in 1997 by Advanced RISC Machines Ltd. The following discussion will also adapt the nomenclature of this reference.

Referring now to FIG. 1, a generic ASB system 100 is depicted as having: an ASB bus 110; two ASB masters A and B (e.g., ARM Processor, PCI (peripheral component interconnect) to ASB Masters etc.); two ASB slave devices X and Y (e.g., memory controllers, slave devices); an ASB decoder 105 (centralized decoder that selects a slave by asserting a device select signal, Dsel); and an ASB Arbiter 107 (arbitrates the bus among multiple masters). Furthermore, a PCI bus 120 is coupled to ASB bus 110 via slave Y. PCI bus 120 is coupled to devices such as PCI devices P and Q that run at slower speed than ASB system 100.

ASB decoder 105 performs the decoding of the data transfer addresses, then selects slaves according to the decoded addresses. ASB arbiter 107 ensures that only one bus master at a time is allowed to initiate data transfers. Masters A and B can initiate a read or a write data transfer. Only one master is allowed by arbiter 107 to access ASB bus 10 at one time. Slaves X and Y respond to a read or a write data transfer. Slaves such as X and Y signal back to the active master the success, failure or extension of the data transfer. Furthermore, when a data transfer is intended for a peripheral device such as PCI device Q, the slower speed of PCI device Q causes latency in slave Y's responses to the data transfer. For this reason, slave Y can be called a lower "latency" slave of ASB system 100.

Slave Responses within an ASB System:

Referring still to FIG. 1, a multiple masters/slaves system bus such as ASB bus 110 necessitates coordination of bus access among the masters and the slaves. Unfortunately, this bus access coordination in turn gives rise to many issues that, if unresolved, can lead to a congested and an inefficient bus architecture. One such issue is ensuring synchronous slave responses with respect to a data transfer. Specifically, in order for ASB bus 110 to function at high clock speed, slave responses need to be driven synchronously onto ASB bus 110. But certain slaves such as slave Y cannot easily respond synchronously because these slaves have slave response latency. Typically, slave response latency comes from slaves (e.g., slave Y) that are coupled to peripheral devices (e.g., PCI device Q) having slower processing speed compared to ASB bus 110.

In particular, certain slaves such as slave Y can constitute intermediary stations between a master such as the ARM microprocessor and a slower peripheral device such as PCI device Q. In order for the ARM microprocessor to communicate with slower peripherals without impacting the system performance, an intermediate "agent" such as slave Y is used as a slave of the ASB bus. This "agent" slave, traditionally called the "bridge" facilitates the communication between the ARM microprocessor (via the ASB bus) and the slower peripherals. Moreover, the slower peripherals can communicate with the ARM processor through such a bridge via a standard interface such as VPB, PCI, APB or their own customary interfaces. Common examples of these peripherals include devices like IDE (integrated drive electronics) disk controllers, UART's (universal asynchronous receiver transmitter) etc., which are slow compared to the microprocessor system bus such as ASB bus 110.

As an example, referring still to FIG. 1, when master A accesses a slow device, such as PCI device Q that is coupled to slave Y, time is needed to compensate for the difference in speeds between master A and the slow PCI device Q. That is, when master A attempts to access the slow PCI device Q, this PCI device Q might not be able to respond to master A immediately. Also, the speed difference between ASB bus 110 and PCI bus 120 creates uncertainty in the timing of slave responses for slave Y. As latency is created at slave Y (hence "latency" slave), driving slave responses synchronously becomes less straightforward. Also, traditionally, the slave devices on ASB bus 110 do not synchronize the incoming signals from a master. Thus, various prior art approaches were implemented to achieve synchronous slave responses in view of these considerations.

Prior Art Implementations:

In order to synchronize slave responses in view of these conditions, the prior art slave devices either a) drive the outputs combinatorially or b) insert wait states. The former method is a bad design practice because it can cause glitches in the timing of ASB bus 110. Moreover, this former method is slow to execute; thus, it limits the speed of operation of the bus. The latter method of inserting wait states affects the system performance and bus throughput. Specifically, in the prior art ASB systems, the ASB slave devices rely on a device select signal "Dsel" (driving by address decoder 105) to make decisions for that clock cycle in which they are addressed. Dsel is a combinatorial decode of 32 address lines generated by the address decoder and hence is a late arriving signal. Typical timing numbers for a 100 MHz ASB bus slave is shown in FIG. 2.

Referring now to FIG. 2, Dsel 251 is driven on the rising edge of Bclk 250 in cell 203 and can take as many as 4 nano seconds to be valid (see TisDsel 222, the input setup time for Dsel). The slave device sampling this Dsel 251 has to use this Dsel signal to drive slave responses. These slave responses are comprised of Bwait 255, Blast 257 and Berror 259 signals that are sampled in the next rising edge of Bclk 250 as shown in FIG. 2. This means that the raw Dsel 251 signal needs to be used as such to make a decision to drive the Bwait 255, Blast 257 and Berror 259 signals even while inserting wait states to achieve synchronous slave responses.

This prior art implementation of synchronous slave responses has at least the following drawbacks. First, use of raw Dsel 251 implies that there can be no high-speed ASB cycles without wait states. Second, registering Dsel 251 inplies that there needs to be at least one clock wait state which results in low performance of the ASB bus. Third, driving Bwait 255, Blast 257 and Berror 259 based on raw Dsel 251 with some combinatorial logic to make the decisions implies that the ASB system can only run at a limited speed. Fourth, using the above implies that the outputs can glitch, hence providing a very dangerous scenario in terms of reliability. Fifth, use of combinatorial outputs makes timing analysis difficult. All these drawbacks can deleteriously affect the performance of the ASB bus. In all, the ASB bus performance relies on synchronous slave responses. Unfortunately, in the prior art implementations, driving slave responses synchronously for certain latency slaves ironically can deleteriously affect the ASB bus performance. Nevertheless, if synchronous slave responses can be achieved for these "latency" slaves without deleteriously affecting the ASB bus performance, then the ASB bus performance can be maintained or even improved.

Thus, a need exists for a method of synchronous slave responses without inserting too many wait states that slow down high speed ASB clock cycles. Also, a need exists for a method of synchronous slave responses without needing to have a one clock wait state. Furthermore, a need exists for a method of synchronous slave responses without relying on some combinatorial logic to make the decisions for the slaves to be able to drive slave responses. Further yet still, a need exists for a method of synchronous slave responses without risking any glitches that prevent the proper functioning of the ASB bus. In addition, a need exists for a method of synchronous slave responses without making timing analysis difficult on account of the combinatorial outputs.

Fortunately, as will be explained in the following pages, the present invention successfully answers all of the needs stated above with a new approach to synchronize slave responses. With this new approach, the present invention improves the throughput of an ASB system.

The approach described in this invention uses a predictive scheme whereby the slave device uses the wait state inserted by the address decoder on the ASB bus to set up synchronous slave responses, and hence lead to the ability of the ASB bus to operate at higher speeds.

SUMMARY

The present invention is drawn to a computer implemented method and system for synchronously driving slave responses onto an ASB (advanced system bus) bus. In particular, by synchronously driving slave responses, the present invention improves the efficiency of bus access coordination for multiple masters and slaves. Until the present invention, synchronous slave responses are either preceded by error prone combinatorial decoding or time consuming wait state insertions onto the ASB bus. In contrast, the present invention drives synchronous slave responses onto the ASB bus without combinatorial decoding and without inserting wait states onto the ASB bus. Rather, the present invention enables the slave devices on an ASB bus to predictively assert the ASB slave bus control signals (Berror, Blast and Bwait). This predictive assertion is implemented by taking advantage of the presence of a wait state inserted by a decoder and/or the address only cycles before actual transfer cycles inserted by ASB bus masters. In doing so, the present invention facilitates the control signals to be asserted synchronously, thus enabling future ASB slave devices to run at higher speeds. Furthermore, in combination with the retract cycles, the ASB slave devices enable much higher system throughput compared to slave devices that would have inserted wait states until the pending transfer is completed.

In particular, the present invention drives slave responses synchronously without inserting any wait states. Furthermore, the present invention drives slave responses synchronously without relying on some combinatorial logic to make the decisions for the slaves to be able to drive slave responses. Further, the present invention drives slave responses synchronously without risking any glitches that prevent the proper functioning of the ASB bus. In addition, the present invention drives slave responses synchronously without using combinatorial outputs to complicate timing analysis. In all, the present invention overcomes the problems of the prior art approach in driving slave responses onto an ASB bus.

In one preferred embodiment of the present invention, a slave asserts slave responses synchronously without inserting any wait state onto an ASB bus. On the one hand, in response to a read transfer from a ASB master, an ASB slave predicts the read transfer to be intended for a device attached to the ASB slave if the device is ready to return read data. In particular, the ASB slave substantiates this prediction by asserting read slave responses during the decoding cycle prior to a device select signal (Dsel) being driven onto the ASB bus. On the other hand, in response to a write transfer from the ASB master, the ASB slave predicts the write transfer to be intended for the device attached to the ASB slave. In particular, the ASB slave substantiates this prediction by asserting write slave responses during the decoding cycle prior to Dsel being driven onto the ASB bus.

In both scenarios predicted by the ASB slave, Dsel is utilized to validate these two predictions. That is, the read slave response driven by the ASB slave does not enter the ASB bus when the device select signal does not select the ASB slave. Also, the write slave response driven by the ASB slave does not enter the ASB bus when the device select signal does not select the ASB slave. In so doing, when these two predictions are valid, the ASB slave can synchronously drive appropriate slave responses onto the ASB bus without inserting wait states. Moreover, when these two predictions are not valid, wrong slave responses are prevented from entering the ASB bus. By not relying exclusively on Dsel to determine and drive slave responses onto the ASB bus, but rather relying on Dsel to validate asserted slave responses from the slave en route to the ASB bus, the present invention answers the existing needs of the ASB bus as stated before.

These and other objects and advantages of the present invention will no doubt become obvious to those of ordinary skill in the art after having read the following detailed description of the preferred embodiments which are illustrated in the various drawing figures.

DETAILED DESCRIPTION OF THE FIGURES

Figure 1:
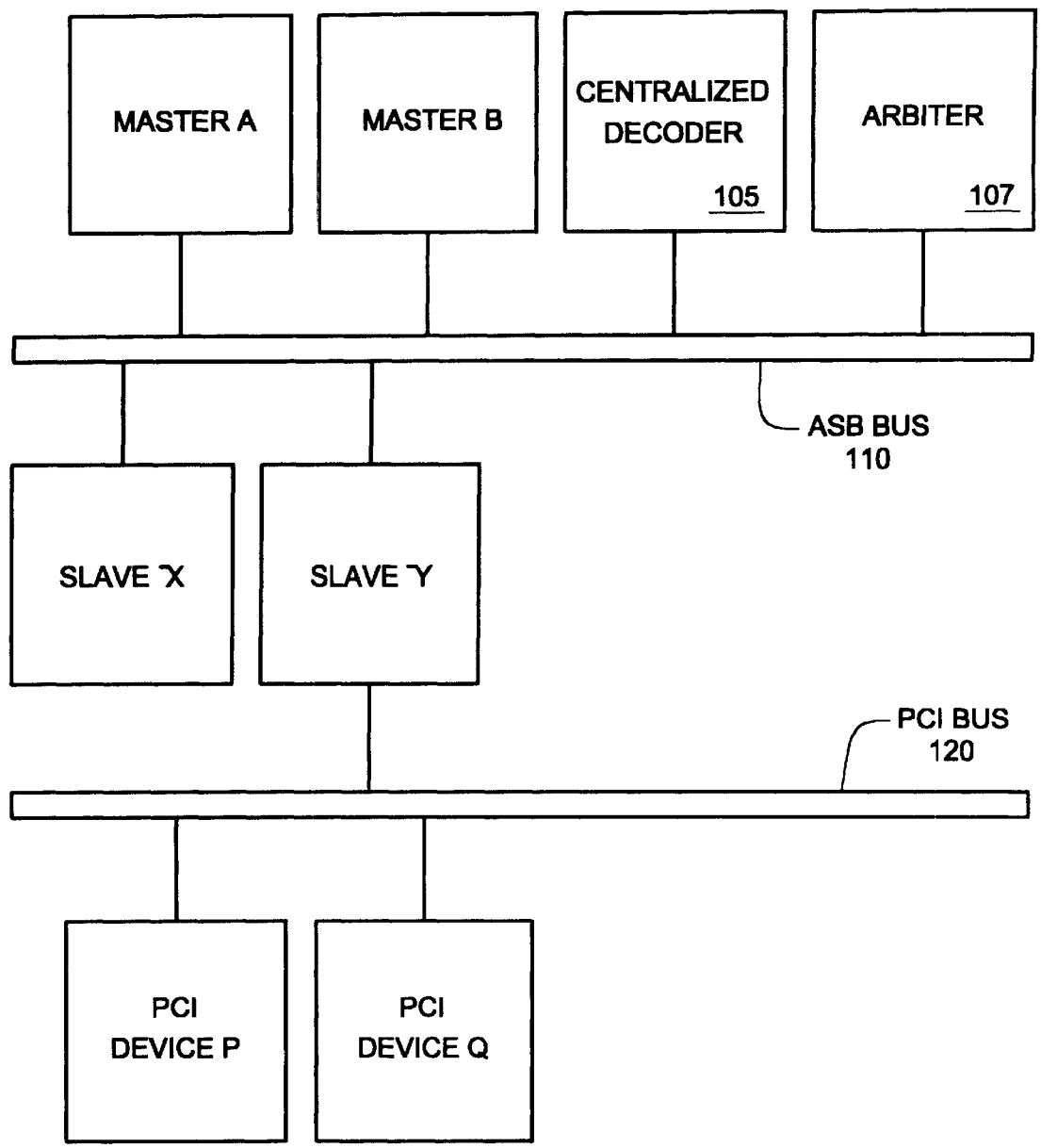
FIG. 1 depicts a generic ASB system.
Figure 2:
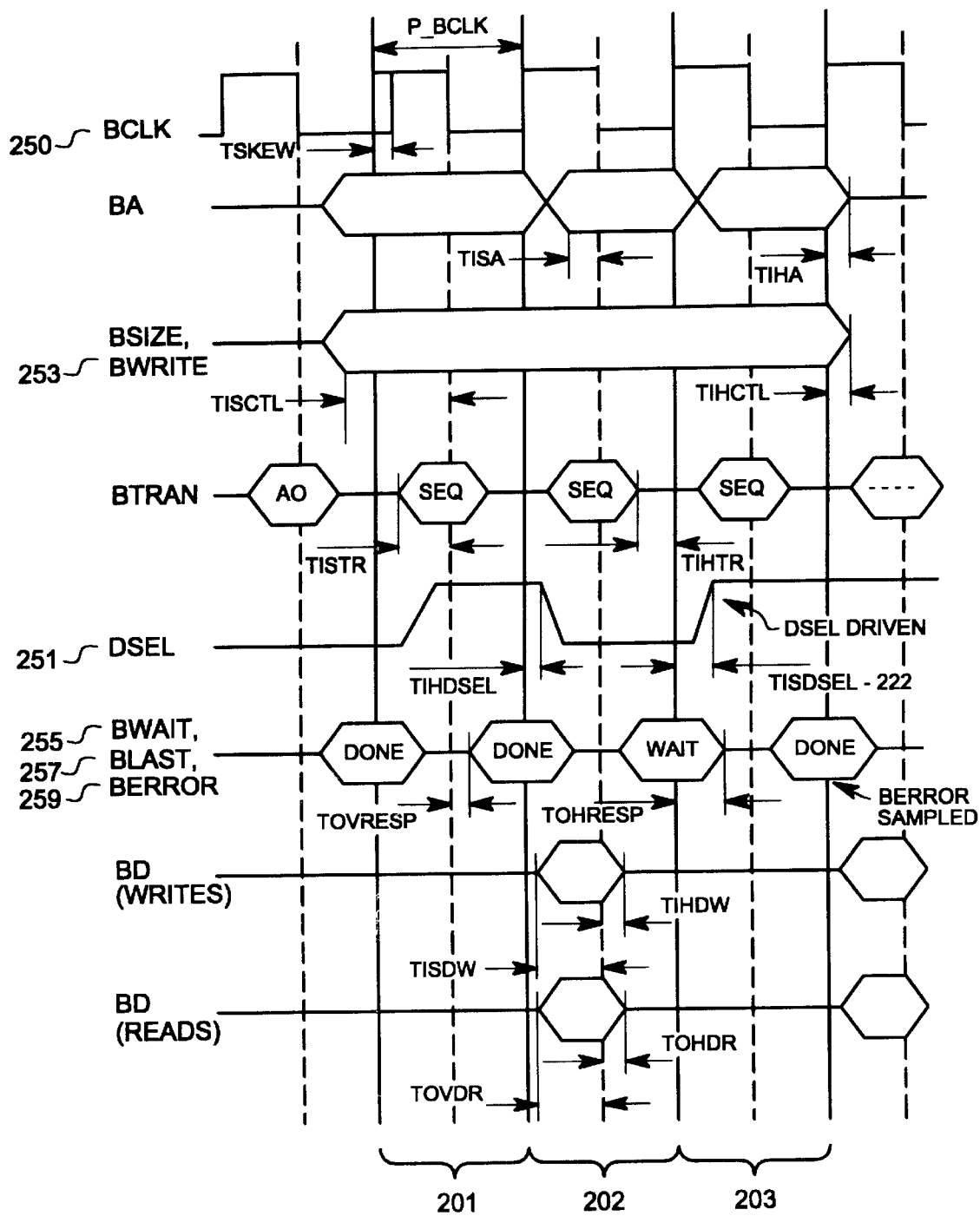
FIG. 2 is a timing diagram for an ASB slave of the ASB system depicted in FIG. 1.

Reference will now be made in detail to the preferred embodiments of the present invention, a computer implemented method and system for synchronous slave responses in an ASB system, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to a person ordinarily skilled in the art that the present invention may be practiced without these specific details. In other instances, well known methods, procedures, components, and circuits have not been described in detail as not to unnecessarily obscure aspects of the current invention.

The Present Invention:

The present invention is drawn to a computer implemented method and system for synchronously driving slave responses onto an ASB (advanced system bus) bus. In particular, by synchronously driving slave responses, the present invention improves the efficiency of bus access coordination for multiple masters and slaves. Until the present invention, synchronous slave responses are either preceded by error prone combinatorial decoding or time consuming wait state insertions onto the ASB bus. In contrast, the present invention drives synchronous slave responses onto the ASB bus without combinatorial decoding and without inserting wait states onto the ASB bus. Rather, the present invention enables the slave devices on an ASB bus to predictively assert the ASB slave bus control signals (Berror, Blast and Bwait). This predictive assertion is implemented by taking advantage of the presence of a wait state inserted by a decoder and/or the address only cycles before actual transfer cycles by ASB bus masters. In so doing, the present invention facilitates the control signals to be asserted synchronously, thus enabling future ASB slave devices to run at higher speeds. Furthermore, in combination with the retract cycles, the ASB slave devices enable much higher system throughput compared to slave devices that would have inserted wait states until the pending transfer is completed.

Compared to the prior art implementation, a slave in the present invention has a more active role. Specifically, in the present invention, before a slave is selected by Dsel (a device select signal), the slave prepares and asserts slave responses anyway without ascertaining the intended target of Dsel's selection. As such, if Dsel does select the slave, the asserted slave responses can be driven onto the ASB bus synchronously without needing to insert any wait states. If Dsel does not select the slave, the asserted slave responses are prevented by Dsel so as not to enter the ASB bus. More specifically, in the present invention, a slave asserts responses BEFORE Dsel is driven active by a centralized decoder of the ASB bus, whereas a slave in the prior art implementation asserts responses AFTER Dsel is driven active by the centralized decoder. Advantageously, in the present invention these asserted slave responses can be driven synchronously without inserting wait states that slow down the performance of the ASB bus.

Figure 3:
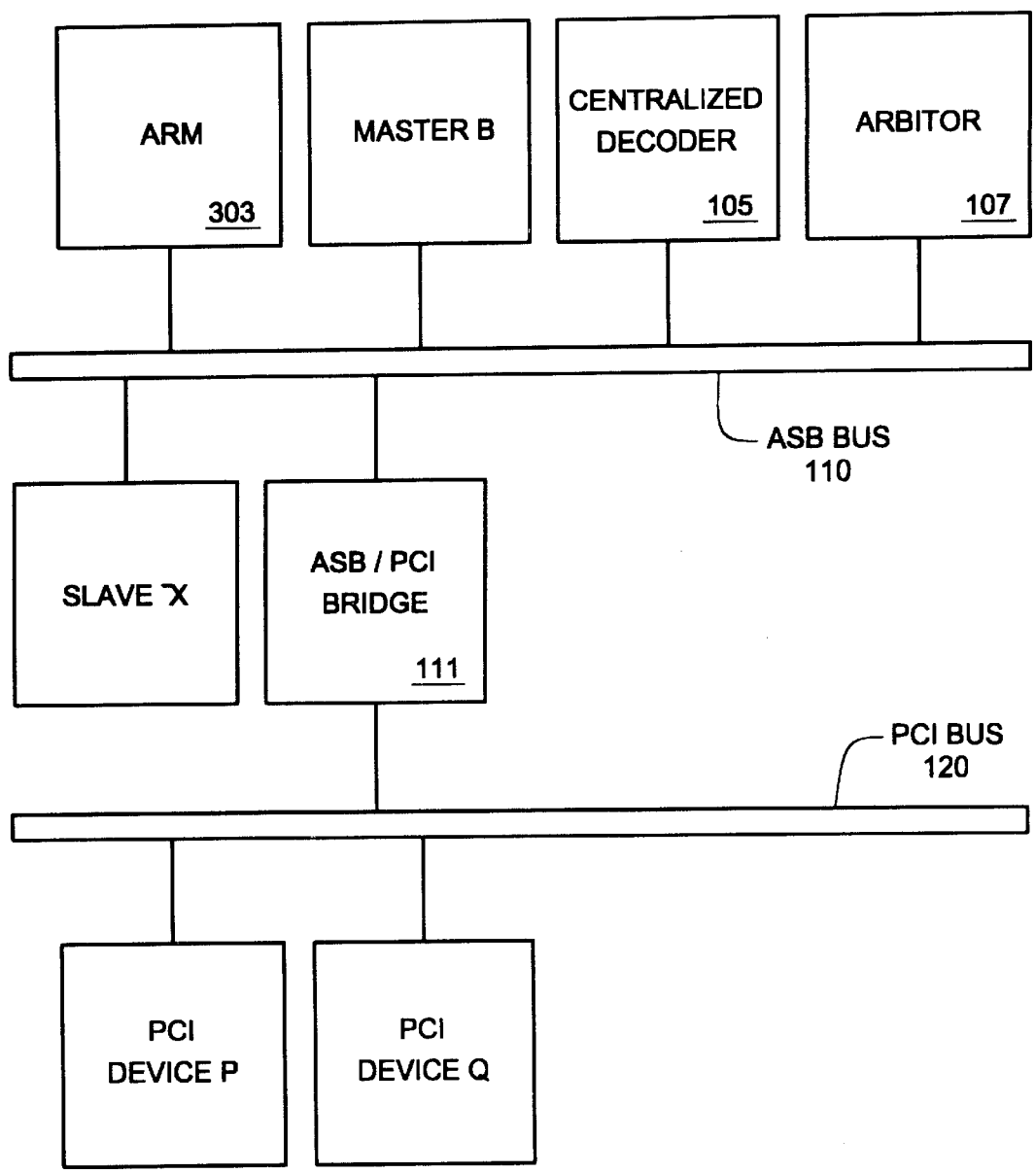
FIG. 3 depicts a portion of an ASB system according to one embodiment of the present invention.

With reference to FIG. 3, one embodiment of the present invention is depicted. In order not to obscure the point of the present invention, only a portion of an ASB bus system 300 is depicted here. ASB system 300 includes components of ASB system 300 that are well suited for describing how synchronous slave responses can be achieved without wait state insertion.

In particular, the portion of ASB system 300 as depicted is comprised of an ASB bus 110, a PCI bus 120, two ASB masters (an ARM microprocessor 303 and master B), a centralized decoder 105, an arbiter 107, two slaves (an ASB/PCI bridge 111 and slave X) and PCI devices P and Q coupled to PCI bus 120. More specifically, ARM microprocessor 303 is an ASB master (among many other ASB masters such as master B) that initiates requests to other ASB slaves. ASB/PCI bridge 111 is a latency ASB slave that takes requests from any ASB master such as ARM microprocessor 303 to any PCI device coupled to the ASB/PCI bridge 111. ASB/PCI bridge 111 is a latency slave because PCI devices coupled to it via PCI bus 120 typically cause latency (delays) in slave responses. In particular, ASB/PCI bridge 111 needs to translate an ASB master's request (to a PCI device such as PCI device Q) from the ASB format into the PCI format so that the request can travel on PCI bus 120 to reach the PCI device. Moreover, the time for PCI device Q to process the request is uncertain. When ARM microprocessor 303 sends a request to PCI device Q, this request cannot travel through PCI bus 120. But after ASB/PCI bridge 111 has converted this request to the PCI format, this request can now reach PCI device Q.

Referring still to FIG. 3, accesses to ASB bus 110 for a master and a slave are performed differently. On the one hand, arbiter 107 detennines which ASB master has access to ASB bus 110. Only one master is granted permission to access ASB bus 110 at one time. On the other hand, centralized decoder 105 determines which ASB slave has access to ASB bus 110. Centralized decoder 105 decodes addresses put onto ASB bus 110. Then, centralized decoder 105 drives Dsel signal for granting ASB slaves access to ASB bus 110. PCI device Q is a slow (compared to the speed of ASB system 300) peripheral device coupled to PCI bus 120; PCI device Q communicates with ASB/PCI bridge 111 through PCI bus 120.

Referring still to FIG. 3, ARM microprocessor 303 typically initiates two types of requests to a latency slave such as ASB/PCI bridge 111. Depending on the types of the requests, various slave responses are driven synchronously by ASB/PCI bridge 111. Typically, ARM microprocessor 303 (an ASB master) attempts to write data to PCI device Q. Sometimes, ARM microprocessor 303 also attempts to read data from PCI device Q. Specifically, when granted access to ASB bus 110 by arbiter 107, ARM microprocessor 303 sends out a request (either a write transfer request or a read transfer request) to ASB/PCI bridge 111 en route to PCI device Q. Since this request is in the ASB format, ASB/PCI bridge 111 converts this request into the PCI format and sends the converted request to PCI bus 120. Once ASB/PCI bridge 111 ascertains the type of transaction request from ARM microprocessor 303, ASB/PCI predicts that the request is intended for PCI device Q. That is, ASB/PCI bridge 111 prepares to drive slave responses as if PCI device Q is the intended target of the transaction request.

Figure 4:
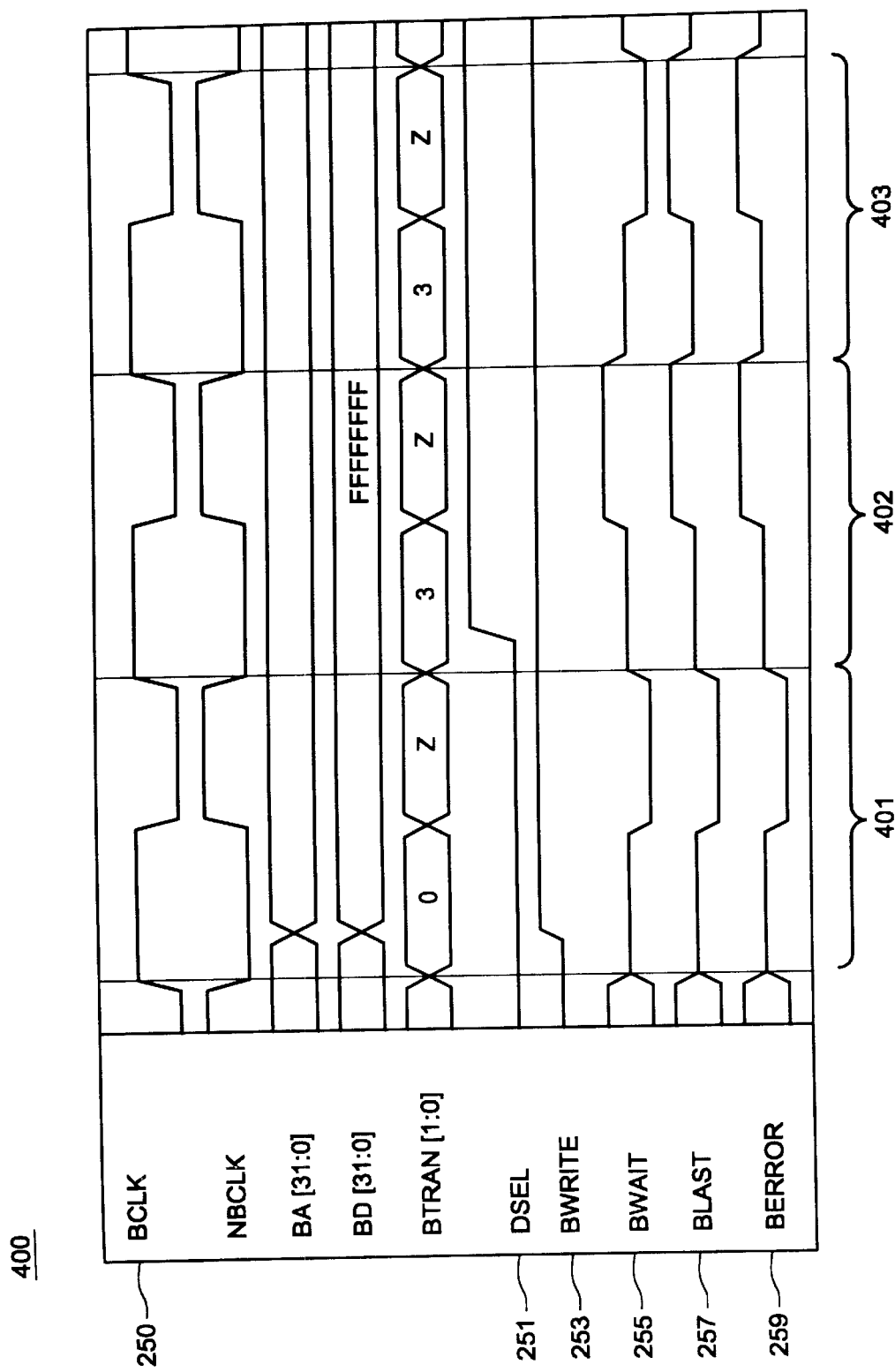
FIG. 4 is a timing diagram for the ASB system of FIG. 3 according to one embodiment of the present invention.

Referring now to FIG. 4, a sample timing diagram 400 of one embodiment of the present invention is shown. Timing diagram 400 depicted in FIG. 4 will be described in conjunction with elements of an ASB system already shown in FIG. 3. However, timing diagrams other than timing diagram 400 can also be used to describe the timing characteristics of the present embodiment.

Referring now to both FIGS. 3 and 4, timing diagram 400 shows three ASB clock cycles: cell 401, cell 402 and cell 403. In cell 401, ARM microprocessor 303 inserts an address only cycle that serves as a decode cycle as indicated by a "0" on Btran. Instead, centralized decoder 105 (see FIG. 3) can insert a wait state. Unlike the prior art approach, the slave (i.e., ASB/PCI bridge 111) makes use of this decode cycle (wait state) by checking during cell 401 for any transaction request being driven onto ASB bus 110. In cell 401, ASB/PCI bridge 111 can ascertain from Bwrite 253 whether or not the transaction is a write transfer request or a read transfer request. However, ASB/PCI bridge 111 will have to wait until arrival of Dsel 251 in cell 402 to ascertain whether or not the transaction (either write or read transfer) is intended for ASB/PCI bridge 111 itself to travel to PCI device Q coupled to ASB/PCI bridge 111. Thus, because Dsel 251 is not driven until at least cell 402, ASB/PCI bridge 111 will not find out the intended recipient of the transaction during cell 402. Furthermore, Dsel 251 typically is driven close to the end of the first half cycle of cell 402 designated for Dsel signal 251. As such, ASB/PCI bridge 111 is left with a short duration just slightly more than an half cycle within cell 402 to combinatorially use Dsel to drive its response signals with enough setup time to the sampling master.

In the prior art implementation, this short duration within cell 402 does not provide enough time for ASB/PCI bridge 111 to synchronize slave responses. In fact, this short duration necessitates wait state insertion in the prior art implementation that can deleteriously affect the performance of ASB bus 110. Advantageously, in the present embodiment ASB/PCI bridge 111 does not rely on this short duration to assert slave responses. Instead, ASB/PCI bridge 111 asserts slave response signals of Bwait 255, Berror 257 and Blast 259 during cell 401 as if the request is indeed intended for ASB/PCI bridge 111. In other words, a whole clock cycle before cell 402, ASB/PCI bridge 111 predicts (during cell 401) that Dsel 251 will select ASB/PCI bridge 111 (during cell 402). In so doing, the present invention avoids the time restriction imposed by the short time duration in cell 402 in synchronizing slave responses. Consequently, the present invention is able to advantageously avoid time consuming wait state insertion in synchronizing slave responses, thus improving the performance of ASB bus 110. Moreover, if Dsel 251 does not select ASB/PCI bridge 111 in cell 402, Dsel 251 will switch off output enables of Bwait 255, Berror 257 and Blast 259. Thus, even if ASB/PCI bridge 111 has made a wrong prediction, Dsel 251 will prevent these wrong slave responses from entering ASB bus 110. Thus, the present embodiment advantageously provide a method and a system for making a safe prediction by a slave.

In contrast, in the prior art approach, a slave such as ASB/PCI bridge 111 remains passive before aiscertaiining Dsel's selection. ASB/PCI bridge 111 is activated after being selected by Dscl 251 driven by centralized decoder 105. Due to the late arrival of Dsel 251 within the clock cycle of cell 402, ASB/PCI bridge 111 inserts wait states to ensure synchronous slave responses of Bwait 255, Blast 257 and Blast 259. Consequently, in the prior art approach, the performance of ASB bus 110 is compromised.

Figure 5:
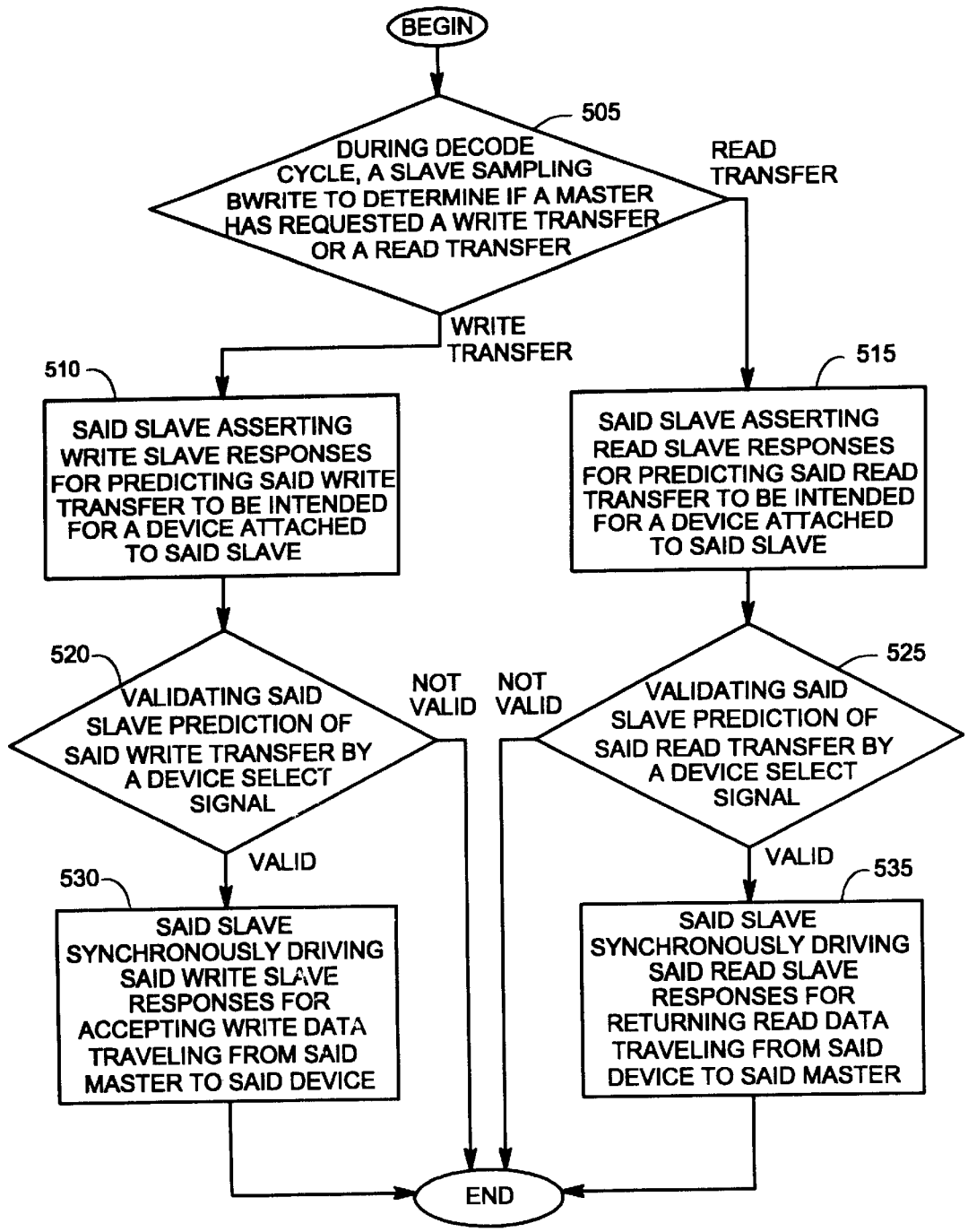
FIG. 5 is a flow chart outlining the steps of one embodiment of the present invention.

Referring now to FIG. 5, a flow chart 500 outlines the steps in one embodiment of the present invention. Both write transfer steps and read transfer steps are outlined in flow chart 500 in order to provide a general view of the present embodiment. In decision step 505, a slave samples the state of Bwrite signal on the ASB bus to determine if a master has requested a write transfer or a read transfer directed at a device coupled to the slave. Specifically in the present embodiment, when Bwrite is sampled to be high, the master is requesting a write transfer to the device coupled to the slave. When Bwrite is sampled to be low, the master is requesting a read transfer to the device coupled to the slave.

In the present embodiment, if Bwrite is sampled high by the slave, the slave predicts in step 510 the write transfer request from the master to be intended for a device coupled to the slave. Specifically, this prediction is implemented by asserting write slave responses comprising the signals of Bwait, Berror and Blast.

Continuing from step 510, in decision step 520, Dsel driven by a centralized decoder of the ASB bus is used to validate the slave's prediction. That is, Dsel from the centralized decoder validates whether the write transfer is really intended for the device coupled to the slave. If the Dsel selects the slave, then the slave's prediction becomes valid, leading the slave to implement step 530. If the Dsel does not select the slave, then the slave's prediction becomes invalid, leading to the ending step of the flow chart.

Specifically, if the Dsel indeed selects the slave, the Dsel switches on output enables of the slave. Then with output enables switched on in step 530, the slave synchronously drives the write slave responses for accepting the write data traveling from the master to the slave.

On the other hand, if the Dsel does not select the slave, output enables of the slave will not be switched on. As such the asserted write slave response signals will not be driven onto the ASB bus at all. Consequently, no further step is taken by the slave; flow chart 500 ends. The slave returns the state where it waits for the next change in Btran.

Referring back to decision step 505, if Bwrite is sampled to be low (thus indicating a read transfer request), the slave implements step 515. In step 515, the slave asserts read slave responses comprising Bwait, Berror and Blast. In so doing, the slave predicts that the read transfer request is intended to a device coupled to the slave.

After asserting the read slave response signals in decision step 525, a Dsel signal from a centralized decoder of the ASB bus is used to validate the slave's prediction. In particular, if the Dsel selects the slave, then the read transfer request is indeed intended for the device coupled to the slave. Thus, the slave's prediction becomes valid, leading the slave to further implement step 535. On the other hand, in decision step 525, if the Dsel does not select the slave to validate the prediction, then the read transfer request is not intended for the device coupled to the slave. Flow chart 500 comes to an end.

Figure 6:
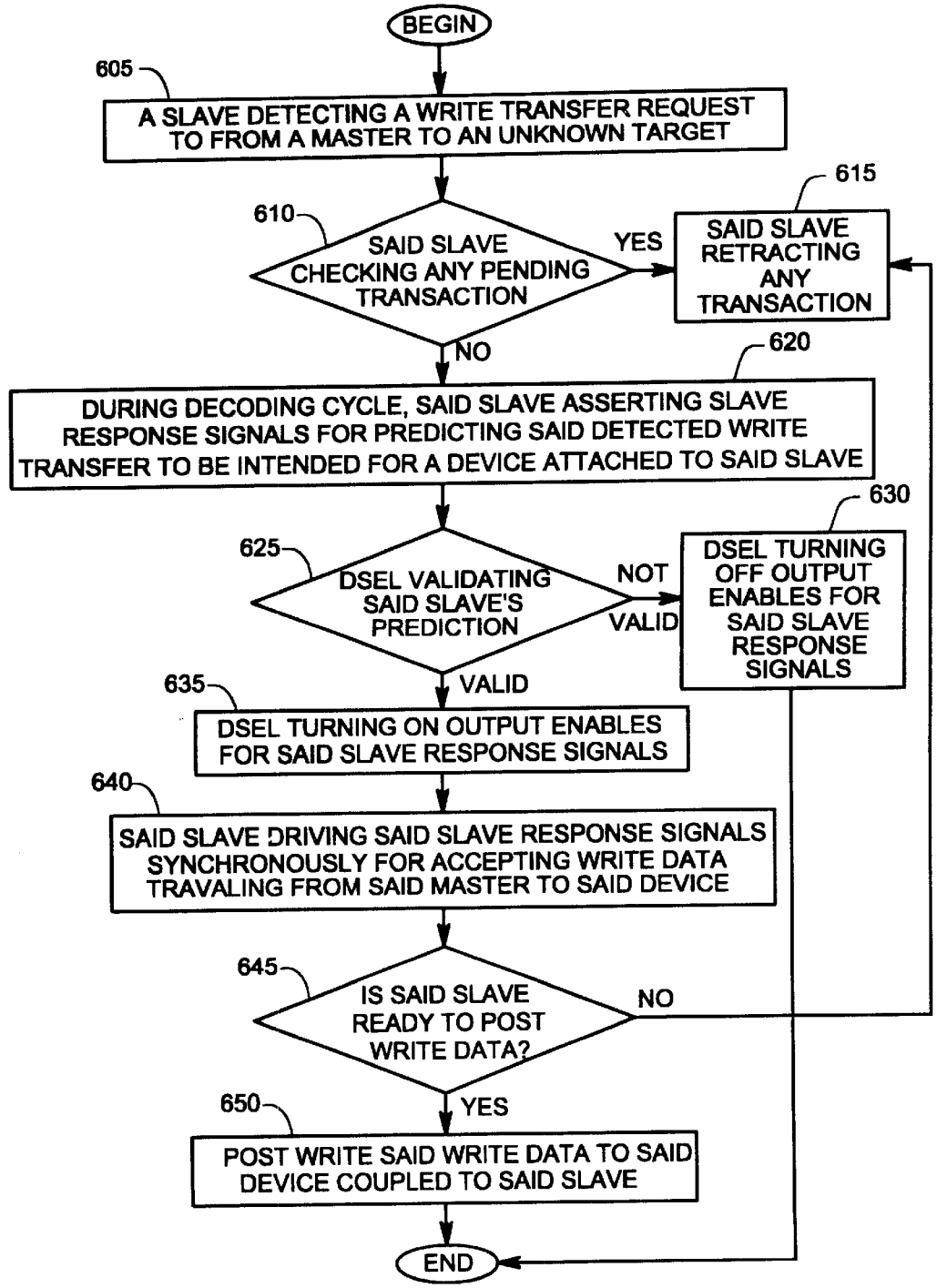
FIG. 6 is a flow chart outlining the steps for a write transfer according to one embodiment of the present invention.
Figure 7:
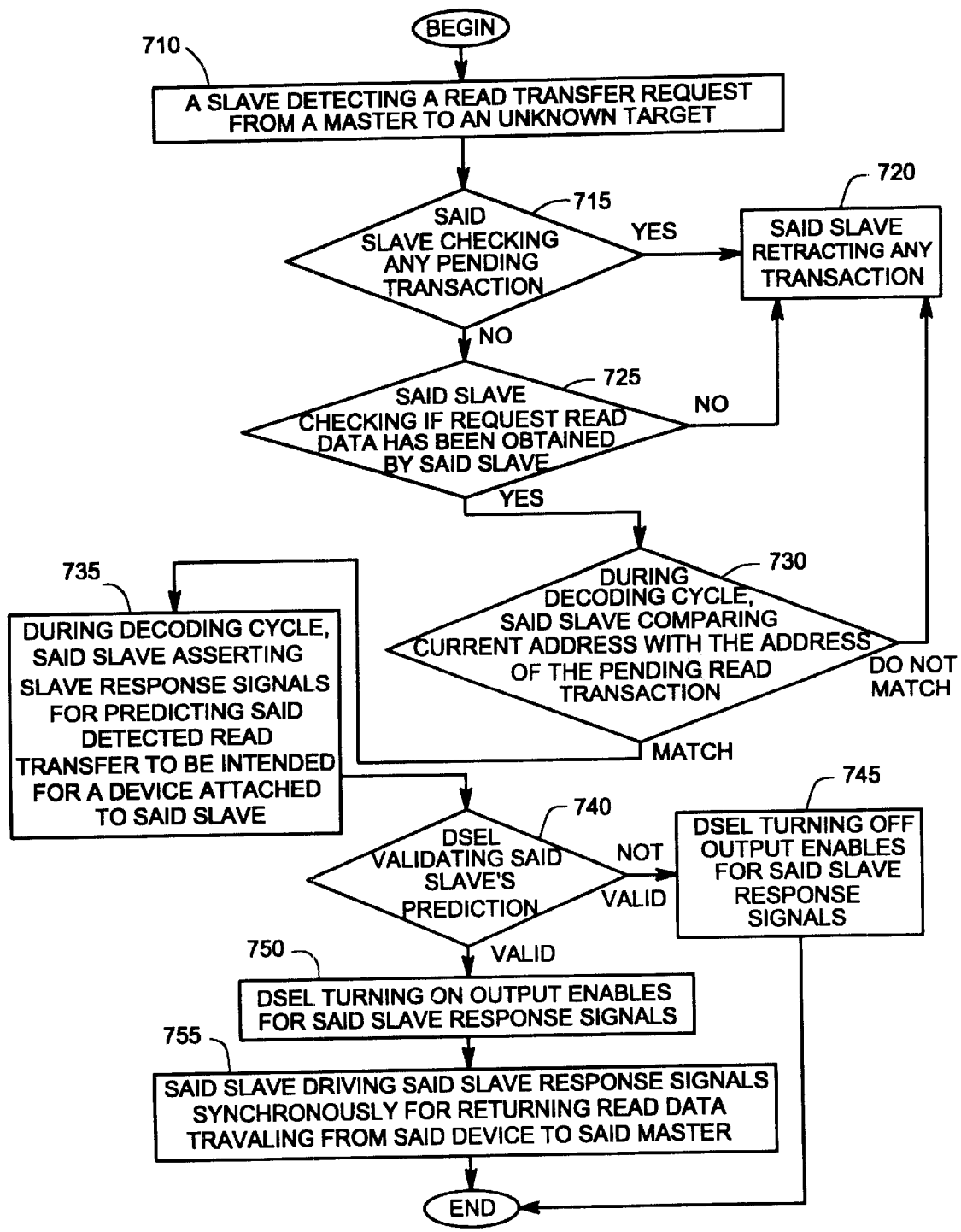
FIG. 7 is a flow chart outlining the steps for a read transfer according to one embodiment of the present invention.

Having described in FIG. 5 the steps implemented in the present embodiment of the present invention, more specific steps implemented in the present embodiment are outlined in FIGS. 6 and 7. In particular, FIG. 6 outlines the steps for a slave to predictively and synchronously respond to a write data transfer. FIG. 7 outlines the steps for a slave to predictively and synchronously respond to a read data transfer.

Synchronous Slave Responses for Write Data Transfer:

Referring now to FIG. 6, a flow chart 600 outlines the steps for a write transfer according to one embodiment of the present invention. In step 605, a slave detects a write transfer request from a master to an unknown target. As such, the slave does not know at this time whether the write transfer is meant for a device coupled to the slave. However, if further conditions to be described are satisfied, the slave will predict that the write transfer is intended to reach a device coupled to the slave. The following steps implement this prediction. Even if this prediction turns out to be wrong, other steps are available to prevent realizing this prediction. In so doing, advantageously, predictions from a slave can be implemented safely without causing errors to the ASB bus.

In decision step 610, the slave checks if any pending transaction exists for the slave. If any transaction is pending at the slave, step 615 is implemented, wherein the slave retracts any transaction arriving at the slave. Specifically, by retracting in step 615, the slave is informing whichever master that sends transactions to attempt sending transactions again at a later time. In so doing, advantageously, the ASB bus is available immediately to be used by other bus masters and slaves.

Continuing with decision step 610, if the slave does not have any pending transaction, the slave enters into steps for implementing its prediction that the write transaction is intended to a device coupled to the slave. In particular, the slave continues with step 620.

In step 620, the slave asserts slave response signals during decoding cycle of the ASB bus. These write slave response signals indicate the slave's prediction. That is, the slave prepares to accept write data from the master as if the write transfer is intended for the slave. If these write slave response signals are actually driven onto the ASB bus, then the slave will actually accept write data.

However, if the write transfer request is not intended for the slave but for another slave, the write slave response signals of the slave must not be allowed to enter the ASB bus. Also, the slave should not sample the write data on the ASB bus because if Dsel is not asserted, then the write data is for a different slave. Thus, a validating step such as decision step 625 is implemented next. In decision step 625, Dsel is used to validate the slave's prediction. Dsel is sent by a centralized decoder of the ASB bus to select among the slaves of the ASB bus. Once Dsel selects a slave, this slave is allowed to send or receive transactions from the ASB bus. Specifically, once a slave is selected by Dsel, this slave's output enables are switched on by Dsel, thus allowing this slave to drive signals onto the ASB bus.

If Dsel in decision step 625 does not select the slave, the slave's prediction becomes invalid. As such, step 630 is implemented next, wherein Dsel does not turn on output enables for the slave response signals to enter the ASB bus. Thus, the invalid slave responses signals are prevented from entering the ASB bus.

If Dsel in decision step 625 does select the slave, the slave's prediction becomes valid. As such, step 635 is performed next to implement the slave's prediction. Specifically, in step 635 Dsel turns on output enables for the slave response signals to enter the ASB bus. Furthermore, in step 640, the slave drives the write slave response signals synchronously for accepting write data traveling from the master to the device. Then, a querying step, decision step 645, follows step 640.

In decision step 645, the slave checks if write data accepted is ready to be post written to the device coupled to the slave. If the slave is not ready, then step 615 is implemented wherein the slave retracts any transaction. On the other hand, if the slave is ready to post write data to the device coupled to the slave, then step 650 is implemented wherein the write data is post written to the device coupled to the slave.

Synchronous Slave Responses for Read Data Transfer:

Referring now to FIG. 7, a flow chart 700 outlines the steps for a read transfer according to one embodiment of the present invention. In step 710, a slave detects a read transfer request from a master to an unknown target. Then, the slave begins several querying steps (decision steps 715, 725, and 730) before predicting that the read transfer request is intended for the slave.

In the first querying step, decision step 715, the slave checks for any pending transaction being processed by the slave. If no transaction is pending, then step 720 is implemented, wherein the slave retracts any other transactions. If a transaction is pending, a further second querying step, decision step 725, is implemented. Specifically in decision step 725, the slave checks if it has any read data ready to be returned. If the slave does not have any read data to return, step 720 is implemented again by the slave to retract any transaction. If the slave has found in decision step 725 any read data ready to be returned to a master, a third querying step, decision step 730, is implemented to begin the slave's prediction process.

In decision step 730, the slave performs an address comparison during decoding cycle. The slave compares the address associated with the read data to the address associated with the current read transfer request. If these two addresses do not match, then step 720 is implemented wherein the slave retracts any transaction. On the other hand, if these two addresses do match, the slave will implement step 735 during the same decoding cycle of the ASB bus.

In step 735, the slave asserts read slave response signals during decoding cycle. In so doing, the slave predicts (during the decoding cycle) the detected read transfer request to be intended for a device coupled to the slave. That is, Dsel is not used to trigger the assertion of the read slave response signals.

Next, in decision step 740, Dsel from a central decoder of the ASB bus is used to validate the slave's prediction. As explained before with respect to flow chart 600 for write data transfer in FIG. 6, Dsel in FIG. 7 serves the same purpose. If Dsel does not select the slave in decision step 740, output enables are not switched on by Dsel. As such, step 745 is implemented wherein Dsel actually prevents the asserted read slave response signal from being driven onto the ASB bus. On the other hand, if Dsel does select the slave in decision step 740, output enables of the slave are switched on in step 750. Furthermore, following step 750, the slave implements step 755, wherein the slave drives the read slave response signals synchronously for returning read data traveling from the device to the master.

In all, the present invention allows synchronous slave responses without the disadvantages associated with the prior art approaches. In particular, the present invention enables synchronous slave responses without inserting wait states that slow down high speed ASB clock cycles. Furthermore, the present invention drives slave responses synchronously without relying on some combinatorial logic to make the decisions for the slaves to be able to drive slave responses. Further, the present invention drives slave responses synchronously without risking any glitches that prevent the proper functioning of the ASB bus. In addition, the present invention drives slave responses synchronously without using combinatorial outputs to complicate timing analysis. Hence, the present invention eliminates the problems of the prior art approach in driving slave responses synchronously onto an ASB bus, thereby advantageously enhancing the bus performance.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. The scope of the invention is intended be defined by the claims appended hereto and their equivalents.

What is claimed is:

1. A method for synchronously driving slave responses onto an ASB (advanced system bus) bus, said method comprising the steps of:
   a) in response to a read transfer from a master, a slave predicting said read transfer to be intended for a device attached to said slave if said device is ready to return read data;
   b) in response to a write transfer from said master, said slave predicting said write transfer to be intended for said device if said device is ready to accept write data and without inserting any wait states, preparing to drive said write slave response signal during a decoding cycle of said address decoder and retracting any other requests for data transfer until said device accepts write data such that said write transfer becomes pending; and
   c) utilizing a device select signal to validate said steps a) and b) such that a read slave response driven by said slave does not enter said ASB bus when said device select signal does not select said slave, and such that a write slave response driven by said slave does not enter said ASB bus when said device select signal does not select said slave.

2. The method of claim 1, wherein said write slave response signal is comprised of a plurality of control signals.

3. The method of claim 1, wherein in said step a), said slave drives said read slave response signal synchronously for returning said read data; and wherein in said step b), said slave drives said write slave response signal synchronously for accepting said write data.

4. The method of claim 1, wherein in said step a), said slave retracts said read transfer if said device is not ready to return said read data; and wherein in said step b), said slave retracts said write transfer if said device is not ready to accept said write data.

5. The method of claim 1, wherein in said step c), said device select signal is driven by an address decoder to switch output enables for said read slave response and said write slave response.

6. A computer system for synchronously driving slave responses onto an ASB (advanced system bus) bus, wherein a memory of said computer system stores therein a computer program which causes said computer system to perform the steps of:
   a) in response to a read transfer from a master, a slave predicting said read transfer to be intended for a device attached to said slave if said device is ready to return read data;
   b) in response to a write transfer from said master, said slave predicting said write transfer to be intended for said device if said device is ready to accept write data; and retracting any other requests for data transfer until said device accepts write data such that said write transfer becomes pending; and without inserting any wait states, preparing to drive said write slave response signal during a decoding cycle of said address decoder;
   c) utilizing a device select signal to validate said steps a) and b) such that a read slave response driven by said slave does not enter said ASB bus when said device select signal does not select said slave, and such that a write slave response driven by said slave does not enter said ASB bus when said device select signal does not select said slave.

7. The computer system of claim 6, wherein said write slave response signal is comprised of a plurality of control signals.

8. The computer system of claim 6, wherein in said step a), said slave drives said read slave response signal synchronously for returning said read data; and wherein in said step b), said slave drives said write slave response signal synchronously for accepting said write data.

9. The computer system of claim 6, wherein in said step a), said slave retracts said read transfer if said device is not ready to return said read data; and wherein in said step b), said slave retracts said write transfer if said device is not ready to accept said write data.

10. The computer system of claim 6, wherein in said step c), said device select signal is driven by an address decoder to switch output enables for said read slave response and said write slave response.

* * * * *